US008784697B2

(12) United States Patent
Chiou et al.

(10) Patent No.: US 8,784,697 B2
(45) Date of Patent: Jul. 22, 2014

(54) CONDUCTIVE PASTES

(75) Inventors: Kuo-Chan Chiou, Tainan (TW); Jun-Rong Chen, Pinghjen (TW); Hsin-Mei Chen, Yuanlin Township, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 242 days.

(21) Appl. No.: 13/560,273

(22) Filed: Jul. 27, 2012

(65) Prior Publication Data

US 2013/0146820 A1 Jun. 13, 2013

(30) Foreign Application Priority Data

Dec. 7, 2011 (TW) ............................. 100145025 A

(51) Int. Cl.
*H01B 1/20* (2006.01)
*C09D 5/24* (2006.01)

(52) U.S. Cl.
USPC ........................................... 252/512; 252/514

(58) Field of Classification Search
USPC ................................ 252/512–514; 430/270.1
See application file for complete search history.

(56) References Cited

U.S. PATENT DOCUMENTS

| | | | | |
|---|---|---|---|---|
| 3,989,644 | A | 11/1976 | Bolon et al. | |
| 2003/0199609 | A1 * | 10/2003 | Yamanouchi et al. | 523/160 |
| 2007/0106017 | A1 | 5/2007 | Kessel et al. | |
| 2008/0169122 | A1 | 7/2008 | Shiraishi et al. | |
| 2008/0250972 | A1 | 10/2008 | Oldenzijl | |

OTHER PUBLICATIONS

Taiwan Office Action for Appl. No. 100145025 dated Jan. 7, 2014, (no English language translation).
Bolon et al., "Radiation Curable Conductive Ink," IEEE Trans. Electr. Insul, vol. EI-13 No. 2, Apr. 1978, pp. 116-121.
Chiolerio et al., "Conductive UV-Cured Acrylic Inks for Resistor Fabrication: Models for their Electrical Properties," Macromol. Chem. Phys. 2010, vol. 211, pp. 2008-2016.

* cited by examiner

*Primary Examiner* — Mark Kopec
(74) *Attorney, Agent, or Firm* — Birch, Stewart, Kolasch & Birch, LLP

(57) ABSTRACT

A conductive paste is provided. The conductive paste includes a conductive powder and a resin composition. The resin composition includes a polyester acrylate oligomer, a hydroxyalkyl acrylate (HAA) and a polyvinylpyrrolidone (PVP) derivative. The conductive powder and the resin composition have a weight ratio of 40-85:15-60. The polyester acrylate oligomer, the hydroxyalkyl acrylate (HAA) and the polyvinylpyrrolidone (PVP) derivative have a weight ratio of 15-70:10-60:3-40.

10 Claims, No Drawings

CONDUCTIVE PASTES

CROSS REFERENCE TO RELATED APPLICATIONS

The present application is based on, and claims priority from, Taiwan Application No. 100145025, filed on Dec. 7, 2011, the disclosure of which is hereby incorporated by reference herein in its entirety.

BACKGROUND

1. Technical Field

The technical field relates to conductive pastes.

2. Description of the Related Art

Current conductive pastes mainly comprise resins as a binder and conductive metals as a filler. The more contact among the conductive metals which enhances electron access among the conductive particles, the more conductivity. However, due to the major difference of physical properties between the conductive metals and resins, there are some problems need to be solved. Therefore, a new conductive paste is needed.

SUMMARY

One embodiment of the disclosure provides a conductive paste, comprising: a conductive powder; and a resin composition, wherein the resin composition comprises a polyester acrylate oligomer, a hydroxyalkyl acrylate (HAA) and a polyvinylpyrrolidone (PVP) derivative.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a conductive paste comprising a conductive powder and a resin composition. The resin composition comprises a polyester acrylate oligomer, a hydroxyalkyl acrylate (HAA) and a polyvinylpyrrolidone (PVP) derivative.

The conductive powder may comprise gold, silver, aluminum, copper, nickel, platinum, carbon black or a combination thereof. The conductive powder may be in a shape of a sheet, grain or a combination thereof. The conductive powder and the resin composition have a weight ratio of about 40-85:15-60.

The polyester acrylate oligomer may be as represented by the following formula:

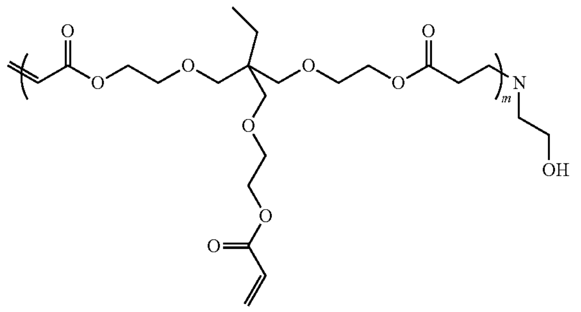

(m=1-5) or

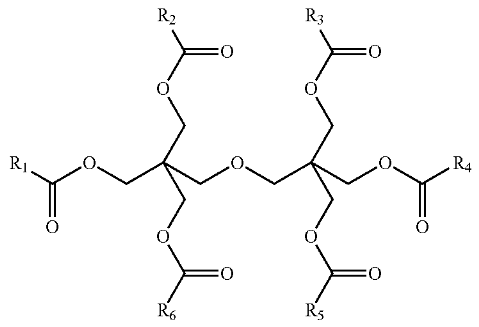

($R_1$—$R_6$, independently, are —CH═CH$_2$ or —$CH_2CH_2N((CH_2)_nOH)_2$ (n=1-15), and at least one of $R_1$—$R_6$ is —$CH_2CH_2N((CH_2)_nOH)_2$). The polyester acrylate oligomer has a viscosity of about 5,000-20,000 cps.

The hydroxyalkyl acrylate (HAA) may be as represented by the following formula:

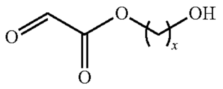

(x=1-4).

The polyvinylpyrrolidone (PVP) derivative may be as represented by the following formula:

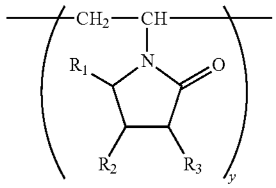

($R_1$, $R_2$ and $R_3$ are —H, —OH or —COOH, and y is 50-5,000).

The polyvinylpyrrolidone (PVP) derivative has a molecular weight of about 55,000-1,500,000.

The polyester acrylate oligomer, the hydroxyalkyl acrylate (HAA) and the polyvinylpyrrolidone (PVP) derivative have a weight ratio of about 15-70:10-60:3-40.

The conductive paste may further comprise a photoinitiator, a photosensitizer, a reactive diluent or a combination thereof.

The photoinitiator may comprise 2-benzyl-2-(dimethylamino)-1-[4-(4-morpholinyl)phenyl]-1-butanone, phenylbis(2,4,6-trimethylbenzoyl)phosphine oxide, 2,4,6-trimethylbenzoyldiphenyl phosphine oxide (TPO) or a combination thereof.

The photosensitizer may comprise 2-isopropylthioxanthone, 4,4'-(tetraethyldiamino)benzophenone or a combination thereof.

The reactive diluent may comprise acrylic acid, acrylate, polyether acrylate or a combination thereof.

The weight ratio of the conductive paste and the photoinitiator is about 100:0.1-100:10. The weight ratio of the conductive paste and the photosensitizer is about 100:0.1-100:10. The weight ratio of the conductive paste and the reactive diluent is about 100:0.1-100:10. The weight ratio of the photoinitiator, the photosensitizer and the reactive diluent is about 0.1-10:0.1-10:0.1-10.

In some embodiments, the conductive paste can be washed out (dissolved) by alcohols. Furthermore, the formulated conductive paste coated on a substrate through a screen printing process forms a high resolution patterned electrode due to the addition of an appropriate amount of PVP therein to adjust the printing characteristics thereof. The printed metal electrode possesses excellent conductivity and adhesion due to high compatibility and reactivity of the conductive metal powders and the photosensitive resins in the paste formulation.

In addition, the present conductive paste can be applied as a conductive material of various electronic products, for example, touch panels, displays, junctions of small electronic devices and flexible devices.

EXAMPLE 1

Preparation, Compositions and Physical Properties of the Conductive Pastes

First, oligomer 223, hydroxyethyl acrylate (HEA), polyvinylpyrrolidone (Mw: 55,000), phenylbis(2,4,6-trimethylbenzoyl)phosphine oxide (photoinitiator 819) and 4,4'-(tetraethyldiamino)benzophenone (photosensitizer EMK) were mixed with various weight ratios and stirred to form a paste. Next, silver sheet was added to the paste (aluminum grain was optionally added to the paste) and mixed by a three-roller mill to form the conductive paste. The fineness of the conductive paste was controlled to under 20 μm.

The silver sheet (d50=5 μm) was purchased from Taiwan EPI Technology Industries Inc. The aluminum grain (d50=3 μm) was purchased from Ceramet Inc. "d50" means a mesh size of a sieve wherein 50% of the powder can pass therethrough.

Adhesion Test:

The conductive paste was coated on a polyethylene terephthalate (PET) substrate. The adhesion of the conductive paste was then tested by a cross hatch test method.

Overflowing Test:

After screen printing, a linewidth of a silver electrode line formed on a printed substrate was measured. Using a screen with 188 μm of mesh as an example, when the linewidth of the silver electrode line was larger than 206.8 μm (188 μm×110%), it meant that the amount of overflowing of the conductive paste was larger than 10%. When the linewidth of the silver electrode line was larger than 244.4 μm (188 μm×130%), it meant that the amount of overflowing of the conductive paste was larger than 30%.

Compositions (weight ratios) and physical properties of various conductive pastes prepared by the example are shown in Table 1.

TABLE 1

| | No. | | | | | | | |
|---|---|---|---|---|---|---|---|---|
| | 86A | 86C | 86G | 86H | 86I | 86O | 86R | 86W |
| Oligomer 223 | 15 | 16.25 | 12.5 | 10 | 13.75 | 9.6 | 11 | 3.33 |
| HEA | 6 | 3.75 | 6.25 | 5 | 5 | 4.8 | 4 | 11.1 |
| polyvinylpyrrolidone (Mw: 55,000) | 1.5 | 2.5 | 3.75 | 3 | 3.75 | 3.6 | 3 | 5.55 |
| Photoinitiator 819 | 1.25 | 1.25 | 1.25 | 1 | 1.25 | 1 | 1 | 1.11 |
| Photosensitizer EMK | 1.25 | 1.25 | 1.25 | 1 | 1.25 | 1 | 1 | 1.11 |
| Silver sheet | 75 | 75 | 75 | 75 | 75 | 75 | 75 | 75 |
| Aluminum grain | 0 | 0 | 0 | 5 | 0 | 5 | 5 | 2.8 |
| Adhesion | 3B | 4B | 4B | 4B | 4B | 5B | 5B | 5B |
| Sheet resistance ($\Omega/cm^2$) | 1.2-1.5 | 1.2-1.6 | 1.3-1.6 | 0.8-1.0 | 1.3-1.8 | 1.5-1.8 | 1.0-1.2 | 0.9-1.1 |
| Amount of overflowing (188 μm) | <30% | <10% | <10% | <10% | <10% | <10% | <10% | <10% |

Oligomer 223:

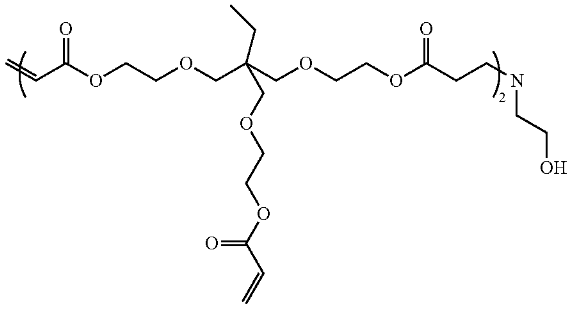

Amount of overflowing: a ratio between a linewidth of a silver electrode line and a mesh size of a screen.

The conductive pastes prepared by the example possessed an improved adhesion (3B above) with the PET substrate. The sheet resistance thereof was more than 0.8 $\Omega/cm^2$. The amount of overflowing thereof was less than 30%.

COMPARATIVE EXAMPLE 1

Compositions and Physical Properties of Other Conductive Pastes

Compositions (weight ratios) and physical properties of various conductive pastes are shown in Table 2.

TABLE 2

| | No. | | |
|---|---|---|---|
| | 78D | 86K | 86X |
| Oligomer 223 | 14 | 0 | 12.5 |
| HEA | 4 | 12.75 | 10 |

TABLE 2-continued

| | No. | | |
|---|---|---|---|
| | 78D | 86K | 86X |
| polyvinylpyrrolidone (Mw: 55,000) | 0 | 9.75 | 0 |
| Photoinitiator 819 | 1 | 1.25 | 1.25 |
| Photosensitizer EMK | 1 | 1.25 | 1.25 |
| Silver sheet | 75 | 75 | 75 |
| Aluminum grain | 5 | 0 | 0 |
| Adhesion | 0B | 5B | 0B |
| Sheet resistance ($\Omega/cm^2$) | 1.5-2.0 | 1.2-1.4 | 0.8-0.9 |
| Amount of overflowing (188 μm) | Serious overflowing (>30%) | Serious overflowing (>30%) | Serious overflowing (>30%) |

In accordance with Table 2, the conductive pastes of No. 78D and 86X had no adhesion with the PET substrate and seriously overflowed during screen printing (after the screen printing, the linewidth of the silver electrode line was 30% larger than the mesh size) due to no addition of polyvinylpyrrolidone thereto. Additionally, although the conductive paste of No. 86K contained polyvinylpyrrolidone, the conductive paste also seriously overflowed during screen printing due to no addition of the oligomer thereto.

EXAMPLE 2

Preparation, Compositions and Physical Properties of the Conductive Pastes

First, oligomer 2610, hydroxyethyl acrylate (HEA), polyvinylpyrrolidone (Mw: 55,000 or 1,300,000), phenylbis(2,4,6-trimethylbenzoyl)phosphine oxide (photoinitiator 819) and 4,4'-(tetraethyldiamino)benzophenone (photosensitizer EMK) were mixed with various weight ratios and stirred to form a paste. Next, silver sheet was added to the paste (aluminum grain was optionally added to the paste) and mixed by a three-roller mill to form the conductive paste. The fineness of the conductive paste was controlled to under 20 μm.

Compositions (weight ratios) and physical properties of various conductive pastes prepared by the example are shown in Table 3.

TABLE 3

| | No. | | | |
|---|---|---|---|---|
| | 91M | 91A | 91C | 91E |
| Oligomer 2610 | 15 | 11 | 11 | 7.5 |
| HEA | 6.75 | 4 | 5.34 | 10 |
| polyvinylpyrrolidone (Mw: 55,000) | 0 | 3 | 2.66 | 5 |
| polyvinylpyrrolidone (Mw: 1,300,000) | 0.75 | 0 | 0 | 0 |
| Photoinitiator 819 | 1.25 | 1 | 0.5 | 1.25 |
| Photosensitizer EMK | 1.25 | 1 | 0.5 | 1.25 |
| Silver sheet | 75 | 75 | 75 | 75 |
| Aluminum grain | 0 | 5 | 5 | 0 |
| Adhesion | 5B | 5B | 5B | 5B |
| Sheet resistance ($\Omega/cm^2$) | 5.0 | 1.6-1.8 | 0.9-1.1 | 0.7-0.9 |
| Amount of overflowing (188 μm) | <30% | <10% | <10% | <10% |

Oligomer 2610:

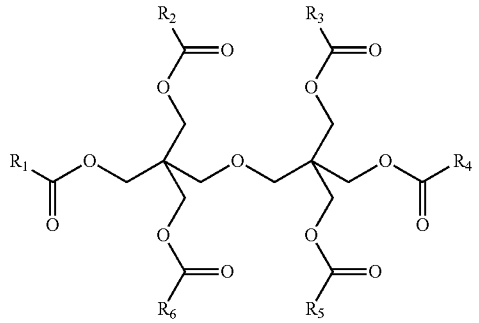

($R_1$—$R_6$, independently, are $-CH{=}CH_2$ or $-CH_2CH_2N((CH_2)_nOH)_2$ (n=1-15), and at least one of $R_1$—$R_6$ is $-CH_2CH_2N((CH_2)_nOH)_2$) (viscosity of 10,000-15,000 cps)

COMPARATIVE EXAMPLE 2

Compositions and Physical Properties of Other Conductive Pastes

Compositions (weight ratios) and physical properties of various conductive pastes are shown in Table 4.

TABLE 4

| | No. 91H |
|---|---|
| Oligomer 2610 | 16.25 |
| HEA | 7.5 |
| polyvinylpyrrolidone (Mw: 55,000) | 0 |
| Photoinitiator 819 | 1.25 |
| Photosensitizer EMK | 0 |
| Silver sheet | 75 |
| Aluminum grain | 0 |
| Adhesion | 5B |
| Sheet resistance ($\Omega/cm^2$) | 1.1-1.8 |
| Amount of overflowing (188 μm) | Serious overflowing (>30%) |

In accordance with Table 4, the conductive paste of No. 91H seriously overflowed during screen printing due to no addition of polyvinylpyrrolidone thereto.

EXAMPLE 3

Preparation, Compositions and Physical Properties of the Conductive Pastes

First, oligomer 2610, hydroxyethyl acrylate (HEA), polyvinylpyrrolidone (Mw: 55,000), phenylbis(2,4,6-trimethylbenzoyl)phosphine oxide (photoinitiator 819) and 4,4'-(tetraethyldiamino)benzophenone (photosensitizer EMK) were mixed with various weight ratios and stirred to form a paste. Next, silver sheet was added to the paste and mixed by a three-roller mill to form the conductive paste. The fineness of the conductive paste was controlled to under 20 μm.

Compositions (weight ratios) and physical properties of various conductive pastes prepared by the example are shown in Table 5.

TABLE 5

| | No. | | | | |
|---|---|---|---|---|---|
| | 91J | 91L | 91K | 91P | 91F |
| Oligomer 2610 | 14 | 11.6 | 40.5 | 9 | 6 |
| HEA | 4.4 | 4.8 | 40.5 | 7 | 8 |
| polyvinylpyrrolidone (Mw: 55,000) | 0.6 | 1.6 | 12.5 | 2.4 | 4 |
| Photoinitiator 819 | 1 | 1 | 3.25 | 0.8 | 1 |
| Photosensitizer EMK | 0 | 1 | 3.25 | 0.8 | 1 |
| Silver sheet | 80 | 80 | 80 | 80 | 80 |
| Aluminum grain | 0 | 0 | 0 | 0 | 0 |
| Adhesion | 5B | 5B | 5B | 5B | 5B |
| Sheet resistance ($\Omega/cm^2$) | 0.4-0.5 | 0.5 | 0.34-0.36 | 0.13-0.17 | 0.5-0.6 |
| Amount of overflowing (188 μm) | <30% | <10% | <10% | <10% | <10% |

In accordance with Table 5, the conductive pastes of No. 91J, 91L, 91K, 91P and 91F had low sheet resistance, even as low as 0.13 (No. 91P), due to high content of the silver sheet (80 wt %). Therefore, the conductive pastes prepared by the example possessed high conductivity.

COMPARATIVE EXAMPLE 3

Compositions and Physical Properties of Other Conductive Pastes

Compositions (weight ratios) and physical properties of various conductive pastes are shown in Table 6.

TABLE 6

| | No. | |
|---|---|---|
| | 91N | 91O |
| Oligomer 2610 | 14 | 13 |
| HEA | 4 | 5 |
| polyvinylpyrrolidone (Mw: 55,000) | 0 | 0 |
| Photoinitiator 819 | 1 | 1 |
| Photosensitizer EMK | 1 | 1 |
| Silver sheet | 80 | 80 |
| Aluminum grain | 0 | 0 |
| Adhesion | 5B | 5B |
| Sheet resistance ($\Omega/cm^2$) | 1.1-1.8 | 1.7-2.2 |
| Amount of overflowing (188 μm) | Serious overflowing (>30%) | Serious overflowing (>30%) |

In accordance with Table 6, the conductive pastes of No. 91N and 91O seriously overflowed during screen printing due to no addition of polyvinylpyrrolidone thereto.

COMPARATIVE EXAMPLE 4

Compositions and Physical Properties of Other Conductive Pastes

Compositions (weight ratios) and physical properties of various conductive pastes are shown in Table 7.

TABLE 7

| | No. | | | |
|---|---|---|---|---|
| | PVA | PVB (B-72) | PVB (B-76) | PVB (B-98) |
| Oligomer 2610 | 13.75 | 13.75 | 13.75 | 13.75 |
| HEA | 6.25 | 6.25 | 6.25 | 6.25 |
| PVA (Mw: 130,000) | 2.5 | 0 | 0 | 0 |
| PVB (Mw: 170,000-250,000) | 0 | 2.5 | 0 | 0 |
| PVB (MW: 90,000-120,000) | 0 | 0 | 2.5 | 0 |
| PVB (Mw: 40,000-70,000) | 0 | 0 | 0 | 2.5 |
| Photoinitiator 819 | 1.25 | 1.25 | 1.25 | 1.25 |
| Photosensitizer EMK | 1.25 | 1.25 | 1.25 | 1.25 |
| Silver sheet | 75 | 75 | 75 | 75 |
| Adhesion | NA | NA | NA | NA |
| Sheet resistance ($\Omega/cm^2$) | NA | NA | NA | NA |
| Miscibility | Poor | Poor | Poor | Poor |

PVA: polyvinyl alcohol
PVB: polyvinyl butyral

In accordance with Table 7, PVA and PVB (soluble in ethanol) were respectively used to replace polyvinylpyrrolidone. The results indicated that the miscibility of the conductive pastes of No. PVA, PVB (B-72), PVB (B-76) and PVB (B-98) (purchased from across company) was poor due to immiscibility between the conductive pastes, the oligomer and HEA. Therefore, "adhesion" and "sheet resistance" of the conductive pastes could not be further measured.

EXAMPLE 4

Thixotropy of the Conductive Paste

The viscosity of the conductive paste of No. 91P was 817.9 Pa·s at a low shear rate. However, at a high shear rate, the viscosity thereof was reduced to 21.02 Pa·s. The results indicated that the alteration of the viscosity of the conductive paste was large when stored and used (by stirring or coating, and other external forces), respectively. That is, the conductive paste possessed an improved thixotropy.

The exemplary photo-curable conductive paste can be washed out (dissolved) by alcohols. Furthermore, the formulated conductive paste coated on a substrate through screen printing formed a high resolution patterned electrode due to adding of an appropriate amount of polyvinylpyrrolidone therein to adjust the printing characteristics thereof. The printed metal electrode possessed excellent conductivity and adhesion due to high compatibility and reactivity of the conductive metal powders and the photosensitive resins in the paste formulation.

In addition, the exemplary conductive paste can be applied as a conductive material of various electronic products, for example, touch panels, displays, junctions of small electronic devices and flexible devices.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A conductive paste, comprising:
a conductive powder; and
a resin composition comprising a polyester acrylate oligomer, a hydroxyalkyl acrylate (HAA) and a polyvinylpyrrolidone (PVP) derivative.

2. The conductive paste as claimed in claim 1, wherein the conductive powder comprises gold, silver, aluminum, copper, nickel, platinum, carbon black or a combination thereof.

3. The conductive paste as claimed in claim 1, wherein the conductive powder is in a shape of a sheet, grain or a combination thereof.

4. The conductive paste as claimed in claim 1, wherein the conductive powder and the resin composition have a weight ratio of 40-85:15-60.

5. The conductive paste as claimed in claim 1, wherein the polyester acrylate oligomer has the following formula:

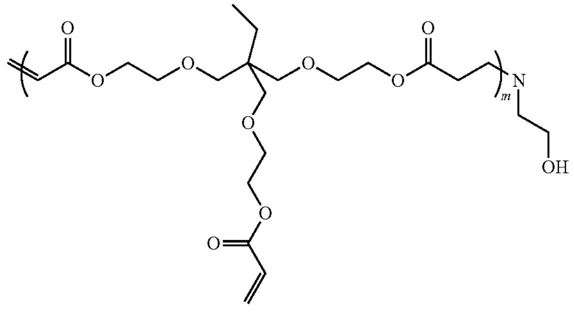

(m=1-5) or

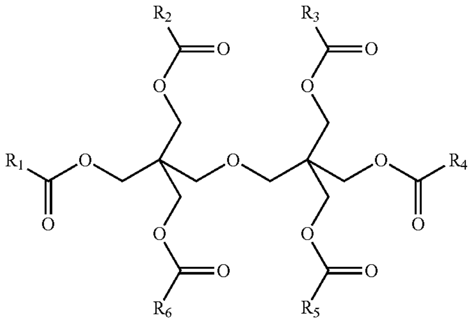

($R_1$—$R_6$, independently, are —CH═CH$_2$ or —$CH_2CH_2N((CH_2)_nOH)_2$ (n=1-15), wherein at least one of $R_1$—$R_6$ is —$CH_2CH_2N((CH_2)_nOH)_2$).

6. The conductive paste as claimed in claim 1, wherein the hydroxyalkyl acrylate (HAA) has the following formula:

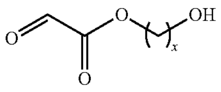

(x=1-4).

7. The conductive paste as claimed in claim 1, wherein the polyvinylpyrrolidone (PVP) derivative has the following formula:

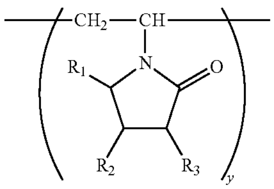

($R_1$, $R_2$ and $R_3$ are —H, —OH or —COOH, and y is 50-5,000).

8. The conductive paste as claimed in claim 1, wherein the polyvinylpyrrolidone (PVP) derivative has a molecular weight of 55,000-1,500,000.

9. The conductive paste as claimed in claim 1, wherein the polyester acrylate oligomer, the hydroxyalkyl acrylate (HAA) and the polyvinylpyrrolidone (PVP) derivative have a weight ratio of 15-70:10-60:3-40.

10. The conductive paste as claimed in claim 1, further comprising a photoinitiator, a photosensitizer, a reactive diluent or a combination thereof.

* * * * *